No. 642,910. Patented Feb. 6, 1900.
M. LEITCH.
FEED WATER HEATER AND FILTER.
(Application filed May 10, 1899.)
(No Model.) 2 Sheets—Sheet 1.
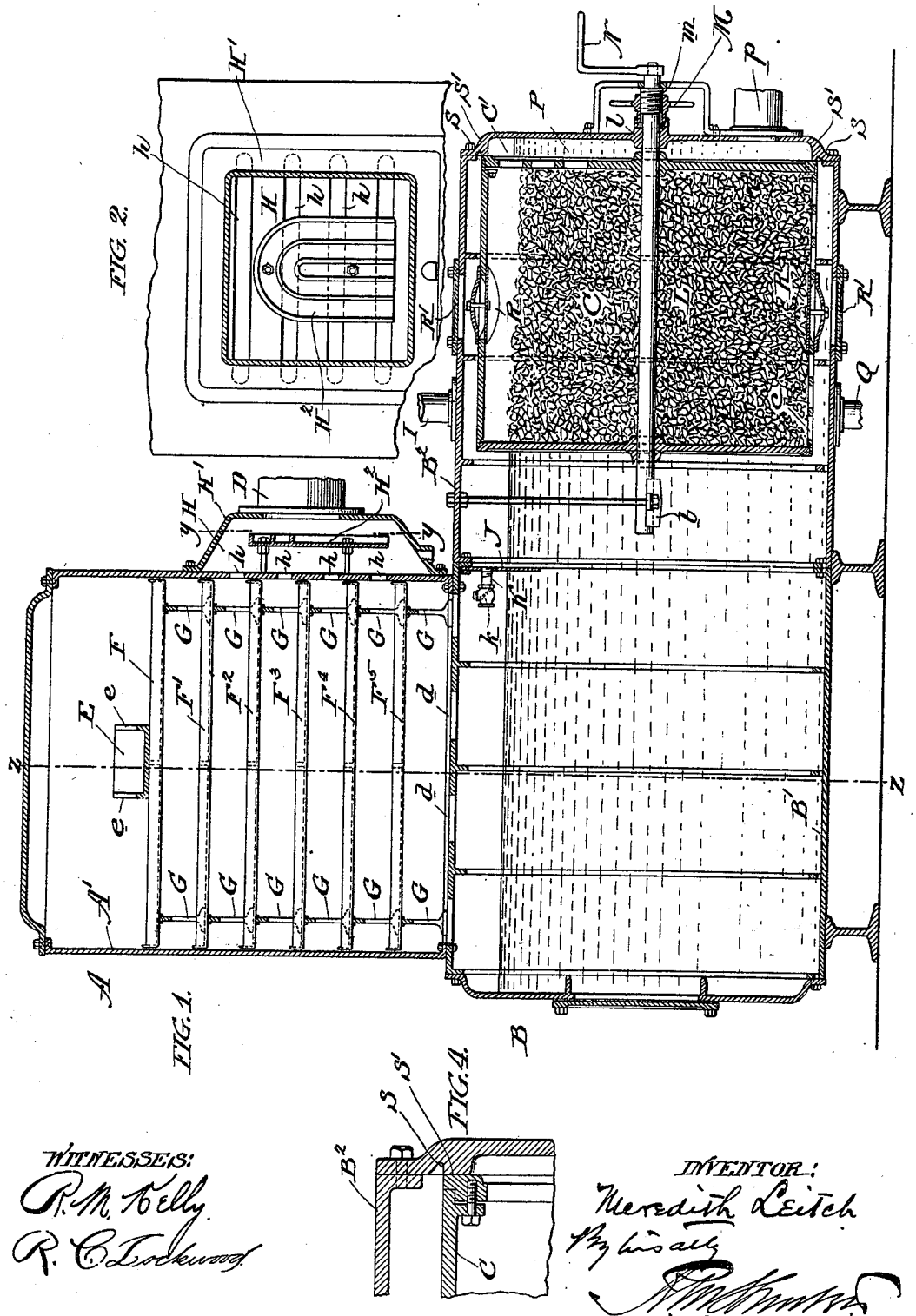

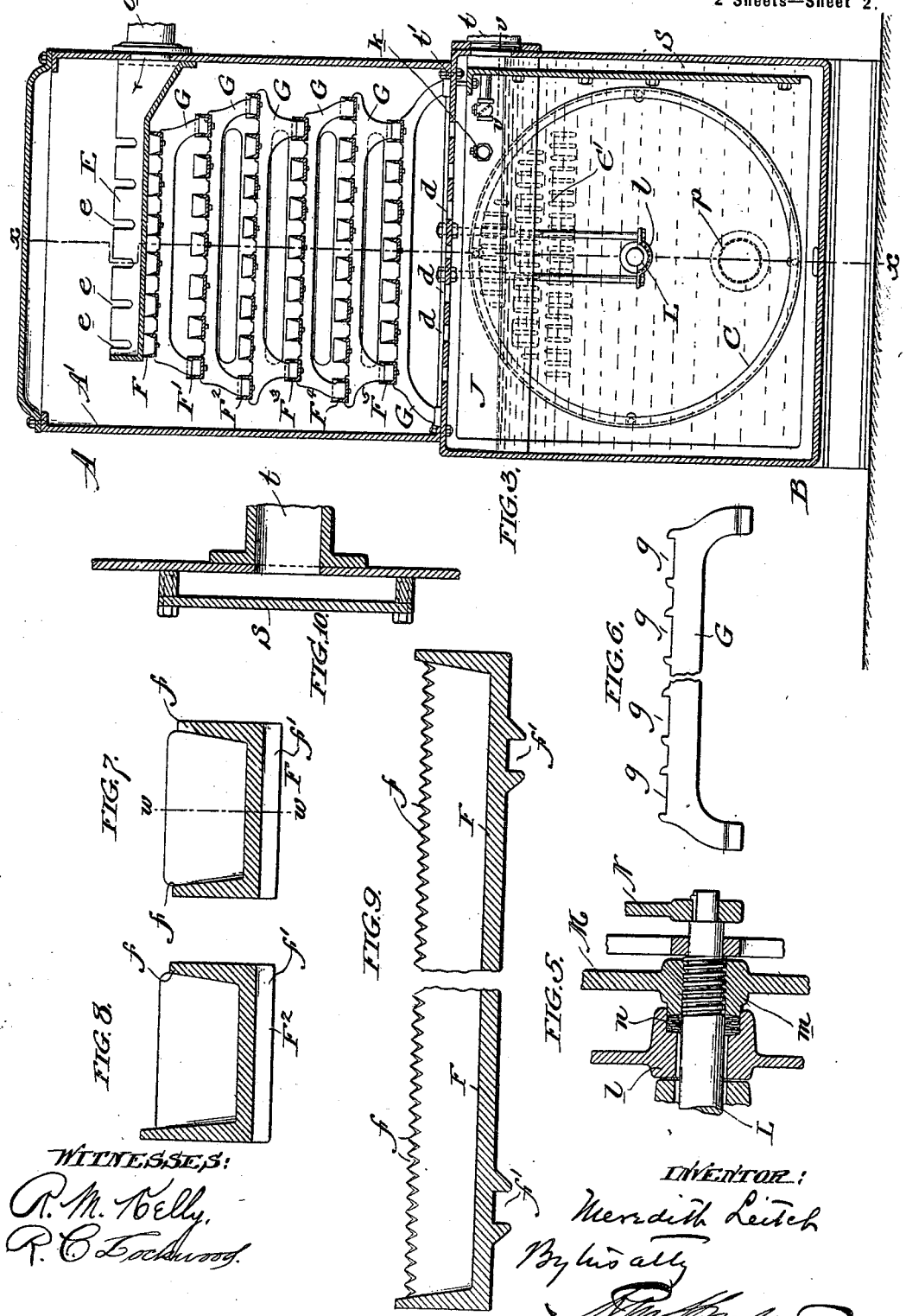

UNITED STATES PATENT OFFICE.

MEREDITH LEITCH, OF BOSTON, MASSACHUSETTS, ASSIGNOR TO THE WARREN WEBSTER & COMPANY, OF CAMDEN, NEW JERSEY.

FEED-WATER HEATER AND FILTER.

SPECIFICATION forming part of Letters Patent No. 642,910, dated February 6, 1900.

Application filed May 10, 1899. Serial No. 716,261. (No model.)

*To all whom it may concern:*

Be it known that I, MEREDITH LEITCH, of Boston, Suffolk county, Massachusetts, have invented an Improvement in Feed-Water Heaters and Filters, of which the following is a specification.

My invention relates to feed-water heaters and filters; and it consists of certain improvements which are fully set forth in the following specification and are shown in the accompanying drawings.

The general objects of this invention are to more effectively and economically raise the temperature of feed-water in a heater by the condensation of steam and to filter and purify the hot water before it passes to the pump.

One part of my invention consists in the combination, with a heater, of a subsiding or settling chamber into which the hot water passes and in which the impurities it contains are largely removed by precipitation; and which is, furthermore, so constructed and arranged that the most purified water will be taken therefrom.

Another part of my invention relates to the combination, with such a heater and subsiding-chamber, of a filter through which the water from the subsiding-chamber passes and by which it is freed of the impurities remaining in suspension.

My invention also includes the combination of such a filter with the heater. It also relates to the construction of the heater whereby the water to be heated is more finely divided and more intimately mingled with the steam.

My invention will be better understood by reference to the accompanying drawings, in which—

Figure 1 is a longitudinal vertical sectional view of a feed-water heater and filter embodying my invention, taken on the line $x\,x$ of Fig. 3. Fig. 2 is a transverse vertical sectional view on the line $y\,y$ of Fig. 1. Fig. 3 is a transverse vertical sectional view on the line $z\,z$ of Fig. 1. Fig. 4 is an enlarged detail view of a part of Fig. 1. Fig. 5 is an enlarged detail view of the means for clamping, releasing, and rotating the filter. Fig. 6 is a front view of one of the water-trap supports. Figs. 7 and 8 are cross-sectional views, enlarged, of the intermediate and end trays, respectively. Fig. 9 is a longitudinal vertical sectional view of one of the trays, taken on the line $w\,w$ of Fig. 7. Fig. 10 is a horizontal sectional view enlarged, taken on the line $v\,v$ of Fig. 3.

The combined feed-water heating and filtering apparatus is composed of a heater A, a subsiding-chamber B, in which the hot water is received from the heater, and a filter C, by which the water is received from the subsiding-chamber and filtered before passing to the feed-pump. For the purpose of greater clearness I shall describe each of these portions of the apparatus separately.

*The heater.*—The heater consists of a closed body A' of suitable shape having a water-inlet $a$, a steam-inlet D, controlled by a suitable valve, and a suitable outlet $d$ for hot water, here shown as a series of openings in the base of the heater.

E is a water-trough leading from the water-inlet $a$ in the upper part of the heater, having the outer end closed and provided with a series of notches or openings $e$ in its sides, through which the water may escape in small streams.

F are a series of trays arranged transversely below the trough E and in such position as to receive the streams of water issuing from the trough E. These trays are trough-shaped and are provided on their edges with small notches or openings $f$, through which the water may escape in finely-divided condition to a second series of trays F', arranged below the trays F, and thence in a similar manner to a third series of trays $F^2$, and so on for as many series of trays (as $F^3\ F^4\ F^5$) as may be found desirable. These trays thus arranged in a series of rows each composed of a multiplicity of independent narrow trays serve to finely divide the water, which falls successively from one to the other in the form of a fine shower and may thus come into intimate contact with the steam which enters through the inlet D.

In my preferred construction the outer sides of the end trays in the longer rows of trays $F^2\ F^4$ are not notched, as there are no trays located below these on the outer side to receive the water that would fall from them on the outer side.

The trays may be supported in any convenient manner. For this purpose, however, I have shown a series of pairs of frames G, the lower pair resting on the base of the heater and the others assembled upon one another, with the trays resting on the horizontal portions and seated in notches $g$ thereon. The trays may also be provided with notches or lugs $f'$ to engage the frames and hold the trays against longitudinal movement. This forms a convenient means of assembling and supporting the trays, while readily permitting of removal and repairs. The steam may be supplied to the heater in any convenient manner. In the particular construction shown it enters a chamber H, formed by a hood H′, and passes thence into the heater through a series of openings $h$, thus being more easily distributed. A baffle-plate H² may be arranged in the chamber H in front of the steam-inlet, as shown, to more effectively distribute the inflowing steam.

*The subsiding-chamber.*—The subsiding-chamber B consists of a suitable shell B′, located below the heater, and receives the hot water therefrom through the openings $d$. It is provided with a lateral extension B², in which the filter C is located.

I is an outlet for air, gases, and vapors in the top of the subsiding-chamber, and J is a partition arranged within the chamber between the inlets from the heater and the outlet I and projecting downward a distance below the normal level of the hot water in the chamber B.

K is an outlet through the partition J, provided with a check-valve $k$, through which the air, vapor, and gases entering the chamber B may escape and pass out through the outlet I.

Q is a drain-outlet in the base of the chamber B or its extension B², and $p$ is an outlet for the purified water, located beyond the filter C, through which it is taken to a boiler-feed pump or drawn off for other purposes.

The water in the heater A is raised in temperature by the condensation of the steam to a temperature nearly that of the steam itself and passes through the openings $d$ into the subsiding-chamber B, in which a considerable body of water is allowed to collect. This highly-heated water will very readily precipitate a great part of its impurities, which fall to the bottom of the chamber B, and as a large body of water is contained in the chamber B every portion will remain there in a quiescent state for a considerable time before it is drawn off by the feed-pump. The longer the water remains in the subsiding-chamber the more will it become freed of its impurities by precipitation, and as the water which remains longest will be coolest and sink to the bottom I so arrange the outlet to the pump in the subsiding-chamber that the lower portions of water, which have remained longest in the chamber, will be discharged. Since, however, only part of the impurities of the water can be discharged by precipitation in the period of time during which the water is permitted to remain in the subsiding-chamber, I prefer to employ a filter C, through which the water must pass before reaching the outlet $p$.

S is an overflow-passage within the chamber B, open at its bottom and leading to an overflow-outlet $t$. It may also be provided with a check-valve $t'$ at the top for the escape of vapors and gases.

*The filter.*—The filter C consists of a cylindrical or hollow shell containing a body of suitable filtering material adapted to remove to a satisfactory extent the impurities contained in the hot water. It is provided with an opening or openings $e$ in the bottom, so located as to receive the lower portions of the water coming from the heater. In the construction shown the filter C is located in the extension B² of the subsiding-chamber. The filter is provided with an outlet or outlets $c'$ in its outer or rear end and located in the upper portion, opposite to the inlets $c$, so that the water will traverse the body of filtering material in an upward direction. The outer or rear end of the filter is provided with a flange or annular face $s$, adapted to seat upon a flange or face $s'$ on the outer head of the casing B² of the subsiding-chamber, thus forming a water-tight joint. Between the outer end of the filter and the head of the chamber B there is formed a water-chamber P, provided with an outlet $p$, leading to the pump.

L is a shaft carrying the filter C and journaled in suitable bearings $l\,l$ in the subsiding-chamber. By thrusting the shaft rearwardly the flanges $s$ and $s'$ may be forced together. To accomplish this, I provide the end of the shaft L exterior to the chamber B with a threaded portion $m$, engaging a threaded nut M, which bears against the packing $n$ between the nut and the outer bearing $l$. By screwing up the nut M the shaft L is drawn longitudinally and the flange $s$ is thrust against the flange $s'$.

N is a crank or handle on the end of the shaft L.

Under normal conditions when the filter is in use it is arranged in the position shown in Fig. 1, with the inlet $c$ in the lower position and the flange $s$ tight against the flange $s'$. As the water which flows in the filter through the inlet $c$ is taken from the bottom of the subsiding-chamber, it is the coolest water, and consequently that which has remained the longest time within the subsiding-chamber. It is therefore the purest water, having had the longest time for the precipitation of its impurities. This water passes upward through the body of the filtering material, thence through the outlets $c'$ into the chamber P, and thence through the outlet $p$ to the pump.

When it is desired to free the filter of its accumulated impurities, the nut M is unscrewed, thus releasing the contact of the flanges $s\ s'$, the water in the subsiding-chamber is lowered through the outlet Q, and the filter is rotated by the crank N. The accumulated impurities are rubbed off by abrasion of the particles of the filtering material with each other and with the shaft and interior surface of the cylinder, and these impurities, with the remaining water, are discharged through the drain Q.

The filter C may be provided with suitably-closed openings R R, and the chamber B² with suitable hand-holes $R'\ R'$, through which the filter may be readily emptied and refilled.

The details of construction which have been shown may be varied without departing from the invention.

What I claim as new, and desire to secure by Letters Patent, is as follows:

1. In a feed-water heater and filter, the combination of the water-heater having steam and water inlets, a subsiding-chamber receiving the hot water from the heater and formed with a lateral extension, a rotary shaft journaled longitudinally in said lateral extension, a filter carried by said rotary shaft within said lateral extension, having an inlet and an outlet located respectively on opposite sides of said rotary shaft, and a water-chamber in said lateral extension beyond the filter and communicating therewith through the outlet thereof.

2. In a feed-water heater and filter, the combination of the water-heater having steam and water inlets, a subsiding-chamber receiving the hot water from the heater and formed with a lateral extension, a rotary shaft journaled longitudinally in said lateral extension, and a filter carried by said rotary shaft within said lateral extension, having an inlet and an outlet located respectively on opposite sides of said rotary shaft.

3. In a feed-water heater and filter, the combination of a water-heater having steam and water inlets, a subsiding-chamber receiving the hot water from said heater and formed with a lateral extension provided with a water-outlet in its outer end, a filtering-chamber located in the lateral extension of said subsiding-chamber and provided at its lower part with a water-inlet and at its upper part with a water-outlet, and forming between its end and the end of the lateral extension of the subsiding-chamber in which the water-outlet is located a water-chamber P communicating with the filter-outlet.

4. In a feed-water heater and filter, the combination of a water-heater having steam and water inlets, a subsiding-chamber receiving the hot water from said heater and formed with a lateral extension provided with a water-outlet in its outer end, a rotary filtering-chamber located in the lateral extension of said subsiding-chamber and provided at its lower part with a water-inlet and at its upper part with a water-outlet, and forming between its end and the end of the lateral extension of the subsiding-chamber in which the water-outlet is located a water-chamber P communicating with the filter-outlet, means to move said filtering-chamber longitudinally with reference to the end of the subsiding-chamber, and means to rotate said filtering-chamber.

5. In a feed-water heater and filter, the combination of a water-heater having steam and water inlets and provided with a subsiding-chamber having an outlet at one end and formed with a flange or rim $s'$, a rotary filter located in the subsiding-chamber of the heater and adapted to make contact with said flange or rim $s'$ and form a water-chamber P between the end of the filter and the subsiding-chamber of the heater, means to move the filter longitudinally to release it from contact with the flange $s'$, and means to rotate said filter.

6. In a feed-water heater and filter, the combination of a water-heater having steam and water inlets and formed with a subsiding-chamber having an outlet $p$ at one end, a shaft L journaled in the subsiding-chamber of the heater, a filter carried by said shaft and provided with water inlets and outlets located respectively at its lower and upper portions, and means to move said filter in contact with the end of the subsiding-chamber adjacent to the outlet $p$ to form a closed chamber P communicating with the filter-outlet.

7. In a feed-water heater, the combination of a multiplicity of independent parallel trough-shaped trays, and a feed-trough arranged transversely above said trays and adapted to supply water thereto.

8. In a feed-water heater, the combination of a feed-trough provided with a series of overflow-outlets, and a multiplicity of independent narrow parallel trough-shaped trays arranged transversely to said feed-trough and below the overflow-outlets thereof and provided in their sides with overflow-outlets.

9. In a feed-water heater, the combination of a feed-trough provided with a series of overflow-outlets, and a series of trough-shaped trays arranged transversely to said feed-trough and below the overflow-outlets thereof and provided in their sides with overflow-outlets, and a second series of trough-shaped trays located below the overflow-outlets of the first series of trays and adapted to receive the water falling therefrom.

10. In a feed-water heater, the combination of a series of rows of parallel trough-shaped trays each row consisting of a multiplicity of trays, provided in their sides with overflow-outlets, the troughs of each lower series being arranged below the overflow-outlets of the next higher series and adapted to receive the water overflowing therefrom.

11. In a feed-water heater, the combination of a series of rows of parallel trough-shaped trays, each row consisting of a multiplicity of trays provided in their sides with serrated or notched edges, the troughs of each lower series being arranged below the serrated or notched edges of the next higher series and adapted to receive the water overflowing therefrom.

12. In a feed-water heater the combination of a series of rows of trays, each row consisting of a multiplicity of independent parallel trays, the trays in each lower series being arranged below the edges of the trays in the next higher series to receive the water flowing from the sides thereof, and means to supply water to the upper row of trays, and a support for the ends of each of said rows of trays.

13. In a feed-water heater, the combination of the series of supporting-frames G mounted one upon the other, the series of rows of independent parallel trays, each row consisting of a multiplicity of trays supported at their ends by one pair of said supports, and said trays being arranged with the trays in each lower row below the edges of the trays in the next higher row to receive the water flowing from the sides thereof.

In testimony of which invention I have hereunto set my hand.

MEREDITH LEITCH.

Witnesses:
WM. LANCASTER,
J. FRANK TUTTLE.